(12) United States Patent
Binder et al.

(10) Patent No.: US 6,280,492 B1
(45) Date of Patent: Aug. 28, 2001

(54) FLANGE FOR A DEVICE FOR SEPARATING AN OIL AEROSOL FROM AIR

(75) Inventors: Walter Binder, Backnang; Lothar Keller, Stuttgart; Michael Wolf, Gaeufelden, all of (DE)

(73) Assignee: Filterwerk Mann & Hummel GmbH, Ludwigshafen (DE)

( * ) Notice: Subject to any disclaimer, the term of this patent is extended or adjusted under 35 U.S.C. 154(b) by 727 days.

(21) Appl. No.: 08/568,344

(22) Filed: Dec. 6, 1995

(30) Foreign Application Priority Data

Dec. 6, 1994 (DE) ............................. 94 19 512 U

(51) Int. Cl.[7] ................................................. B01D 46/00
(52) U.S. Cl. .............................. 55/350.1; 55/502; 96/189
(58) Field of Search .................................. 55/350.1, 502; 96/189

(56) References Cited

U.S. PATENT DOCUMENTS

| 1,109,372 | * | 9/1914 | Thurman ................................. 55/502 |
| 3,118,837 | * | 1/1964 | Briggs .................................... 55/502 |
| 3,231,089 | | 1/1966 | Thornton . | |
| 3,243,042 | * | 3/1966 | Moulton ................................. 55/502 |
| 3,395,208 | * | 7/1968 | Witchell ................................. 55/502 |
| 3,672,130 | * | 6/1972 | Sullivan et al. ....................... 55/502 |
| 3,680,286 | * | 8/1972 | Nostrand et al. ...................... 55/502 |
| 3,721,071 | * | 3/1973 | Mueller et al. ........................ 55/502 |
| 4,349,363 | * | 9/1982 | Patel et al. ............................. 55/502 |
| 4,818,403 | | 4/1989 | Nagaoka . | |
| 5,167,680 | * | 12/1992 | Gardner ................................. 55/502 |

FOREIGN PATENT DOCUMENTS

| 4405494 | 4/1995 | (DE) . |
| G 89 04 689.7 | 9/1990 | (EP) . |
| 505693 | 9/1992 | (EP) . |
| 581153 | 2/1994 | (EP) . |
| 1385428 | 12/1964 | (FR) . |
| 2251347 | 7/1975 | (FR) . |
| 2393597 | 1/1979 | (FR) . |
| 1367535 | 9/1974 | (GB) . |
| 1583736 | 5/1978 | (GB) . |
| 2172359 | 9/1986 | (GB) . |

* cited by examiner

*Primary Examiner*—C. Scott Bushey
(74) *Attorney, Agent, or Firm*—Crowell & Moring, L.L.P.

(57) ABSTRACT

A flange for a device for separating an oil aerosol from air. This flange consists of a rubber-coated sheet metal and has the purpose of providing a seal between a housing and a mounting plate.

7 Claims, 2 Drawing Sheets

US 6,280,492 B1

FLANGE FOR A DEVICE FOR SEPARATING AN OIL AEROSOL FROM AIR

BACKGROUND OF THE INVENTION

The invention relates to a flange particularly for a device for separating an aerosol from air.

Published German Patent Application No. DE 3,311,682 discloses an air drying system for a compressed air apparatus driven by a compressor, especially the air-brake apparatus of motor vehicles. It operates with a drying agent which has a limited absorption capacity and has to be changed frequently as liquid accumulates.

Furthermore, German Utility Model No. DE-GM 85/01,736 discloses an air de-oiling element which is constructed as a changeable filter. This means that the coalescer is disposed in a replaceable element. This replaceable element can be fastened to a separator head with a central mounting screw thread. A disadvantage of this known oil separator is that when the coalescer is changed, the entire replaceable element must be removed and replaced with a fresh one. As a result, a large amount of waste, in particular waste requiring special handling, must be disposed of.

SUMMARY OF THE INVENTION

It is an object of the invention to provide an improved device for separating an oil aerosol from air.

Another object of the invention is to provide a device for separating an oil aerosol from air which produces only a small amount of waste material for subsequent waste disposal.

These and other objects of the invention have been achieved by providing an apparatus for separating an oil aerosol from air which comprises a flange which is formed of a rubber-coated metal sheet.

The invention thus relates to a device for separating an oil aerosol from air in which a flange is provided which consists of a rubber-coated sheet metal.

Rubber-coated sheet metal is described, for example, in the literature of EAGLE PICHER Industries GmbH. This document discloses flat gaskets of rubber-coated sheet metal and other sealing materials, as well as noise absorbing plates for motor vehicle brakes etc.

The invention utilizes the advantages of these rubber-covered sheet metals and uses them in a flange which on one hand has a sealing action and on the other hand can be equipped with appropriate fastening means.

In accordance with one preferred embodiment of the invention, provision is made for the use of sheet metal that is coated with rubber on both sides. In this way a sealing action can be achieved on both sides of the flange. The flange is preferably disposed on an annular coalescer. Such a coalescer element is disposed on the one hand between the surrounding housing and a base element.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
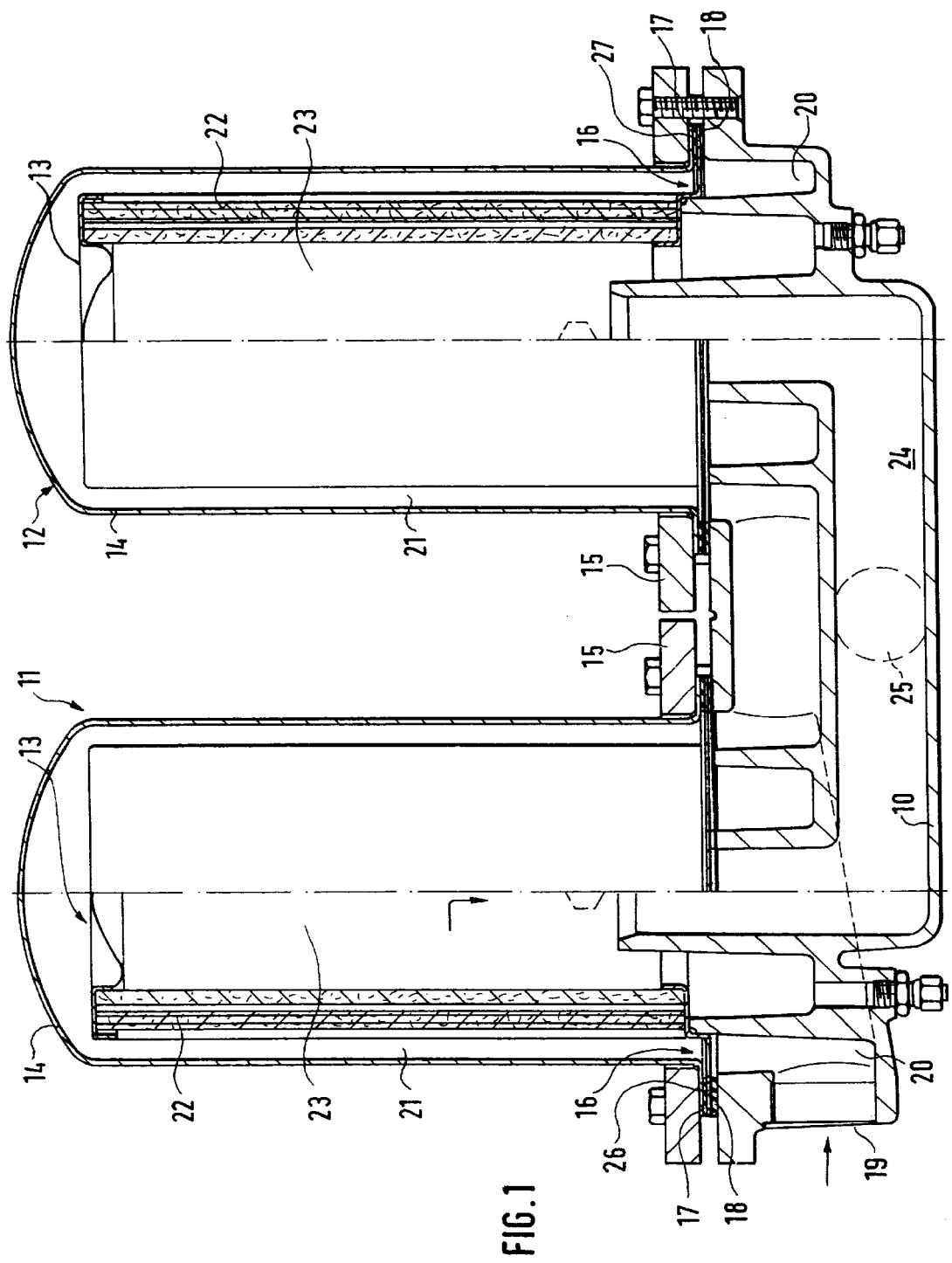
FIG. 1 shows the use of a flange according to the invention in a parallel arrangement of two air de-oiling elements.

FIG. 1 shows two air de-oiling elements 11 and 12, which are fastened on a base member or flange piece 10. The air de-oiling elements each consist of an oil separator 13, a housing 14 and mounting rings 15. Each housing 14 and associated oil separator 13 form a unit releasably mounted on the base member 10. To replace the oil separator, the mounting ring 15 is released and the housing 14 is removed.

Figure 2:
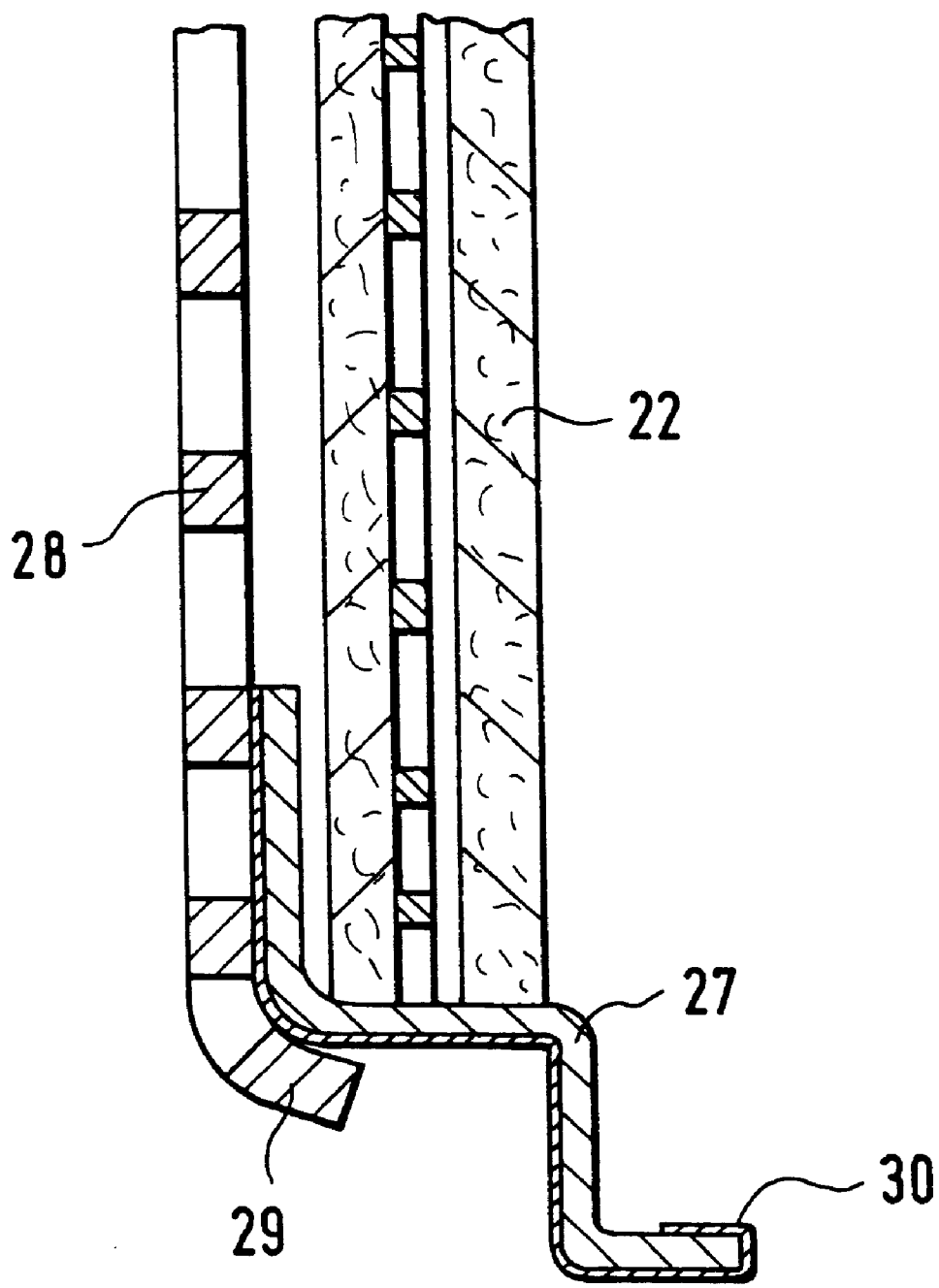
FIG. 2 shows a detail view of another embodiment of a flange.

FIG. 2 shows a detail view of another embodiment of a flange. The flange 27 in this version is situated within an inside cylinder or tube 28. This inside cylinder 28 is slightly crimped at its bottom part 29. The coalescer element 22 is disposed inside the flange 27, as shown in FIG. 1. A metal coated adhesive band or copper foil 30 is cemented to the flange 27 in order to form an electrical connection between the inside cylinder 28 and the housing 14 or base member 10. This copper foil thus connects the inside tube 28 electrically to the housing 14 and effectively prevents any static electrical charging of the coalescer element.

The air from which oil is to be removed flows through the inlet opening 19 and distribution passages 20 into the outer chambers 21 of the two oil separators 13. Then this air flows through the coalescer elements 22 of the oil separators 13 and exits the oil separators 13 through the inner chambers 23. The de-oiled air passes through the outlet passage 24 and the outlet opening 25 in base member 10 to an internal combustion engine, which is not shown in the drawing.

In the device shown in the drawings, it is possible to operate both of the oil separators in parallel. But it is also possible to operate only one of the two oil separators or to alternate between them through an appropriate changeover valve which can be disposed in the base member 10. Thus, the device can be adapted to various operating conditions.

Referring to FIG. 1, sealing between the mounting rings 15 and base member 10 is accomplished through a flange 26, 27, that is rubber-covered on both sides. The oil separator element 13 is fastened to this flange by means of an adhesive strip or the like. By coating the flange on both sides with rubber, a reliable seal is produced on the one hand between the base member 10 and the housing 14, and on the other between the inlet opening 19 and the outlet opening 25.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for separating an oil aerosol from air comprising:
   a base member;
   an annular coalescer mounted on said base member via a flange consisting of metal sheet coated with rubber; and
   a housing surrounding said coalescer, said housing being mounted on said base member,
   wherein said flange extends between said housing and said base member to form a seal therebetween, and further comprising a metal-coated adhesive band arranged on said flange to electro-conductively connect an inside tube of the coalescer element with at least one of said base member and said housing.

2. An apparatus for separating an oil aerosol from air comprising:

a base member;

an annular coalescer mounted on said base member via a flange consisting of metal sheet coated with rubber; and a housing surrounding said coalescer, said housing being mounted on said base member, wherein said flange extends between said housing and said base member to form a seal therebetween, and wherein said base member includes a first passage and a second passage therethrough, an exterior of said coalescer element being in communication with one of said passages, an interior of said coalescer element being in communication with the other of said passages, wherein a portion of the metal sheet which is coated with rubber extends to an area of said base member between said first passage and said second passage to form a seal therebetween.

3. An apparatus for separating an oil aerosol from air, comprising:

a base member including a passage for an air-oil mixture and a passage for clean air;

at least two annular coalescer elements, each said coalescer element being mounted on said base member via a respective flange, an exterior of each said coalescer element being in communication with one of said passages, an interior of each said coalescer element being in communication with the other of said passages; and a respective housing surrounding each said coalescer element, said respective housing being mounted on said base member, wherein each said respective flange consists of a metal sheet with at least a portion of the metal sheet being coated with rubber, said portion of the metal sheet which is coated with rubber extending between said respective housing and said base member to form a seal therebetween.

4. An apparatus according to claim 3, wherein said portion of the metal sheet which is coated with rubber extends to an area of said base member between said inlet passage and said outlet passage to form a seal therebetween.

5. An apparatus according to claim 3, wherein said metal sheet is coated with rubber on both sides.

6. An apparatus according to claim 3, further comprising a metal-coated adhesive band arranged on said flange to electro-conductively connect an inside tube of the coalescer element with at least one of said base member and said housing.

7. An apparatus according to claim 3, wherein said flange comprises a stepped cross-section having at least two portions bent essentially at a right angle to each other.

* * * * *